US011361076B2

(12) United States Patent
Nilangekar et al.

(10) Patent No.: US 11,361,076 B2
(45) Date of Patent: Jun. 14, 2022

(54) VULNERABILITY-DETECTION CRAWLER

(71) Applicant: ThreatWatch Inc., Mountain View, CA (US)

(72) Inventors: Ketan Sateesh Nilangekar, Los Gatos, CA (US); Amol Narayan Godbole, Fremont, CA (US)

(73) Assignee: THREATWATCH INC., Mountain View, CA (US)

( * ) Notice: Subject to any disclaimer, the term of this patent is extended or adjusted under 35 U.S.C. 154(b) by 714 days.

(21) Appl. No.: 16/172,683

(22) Filed: Oct. 26, 2018

(65) Prior Publication Data

US 2020/0134179 A1   Apr. 30, 2020

(51) Int. Cl.
   *G06F 21/55* (2013.01)
   *G06F 21/56* (2013.01)
   *G06N 20/00* (2019.01)
   *G06F 16/951* (2019.01)

(52) U.S. Cl.
   CPC .......... *G06F 21/566* (2013.01); *G06F 16/951* (2019.01); *G06F 21/552* (2013.01); *G06N 20/00* (2019.01)

(58) Field of Classification Search
   CPC ..... G06F 21/566; G06F 21/552; G06F 16/951
   See application file for complete search history.

(56) References Cited

U.S. PATENT DOCUMENTS

| | | | | |
|---|---|---|---|---|
| 6,418,452 B1 * | 7/2002 | Kraft | ...................... | G06F 16/951 |
| 7,085,780 B2 * | 8/2006 | Sakamoto | ............... | G06F 21/55 |
| 7,603,350 B1 * | 10/2009 | Guha | .................... | G06F 16/951 |
| | | | | 707/999.005 |
| 8,108,389 B2 * | 1/2012 | Bobick | ................. | G06F 40/284 |
| | | | | 707/736 |
| 8,250,651 B2 * | 8/2012 | Huang | .................. | G06F 16/951 |
| | | | | 726/22 |
| 9,158,855 B2 * | 10/2015 | Glance | .................. | G06F 40/205 |
| 9,317,574 B1 * | 4/2016 | Brisebois | .............. | G06F 16/254 |
| 9,882,999 B1 * | 1/2018 | Xu | ..................... | G06Q 30/0255 |
| 10,162,900 B1 * | 12/2018 | Chatterjee | ............. | G06F 16/248 |
| 2002/0032740 A1 * | 3/2002 | Stern | ................... | G06F 16/9535 |
| | | | | 709/206 |
| 2002/0194161 A1 * | 12/2002 | McNamee | ............ | G06F 16/951 |
| 2004/0128285 A1 * | 7/2004 | Green | ..................... | H04L 29/06 |

(Continued)

*Primary Examiner* — Ponnoreay Pich
(74) *Attorney, Agent, or Firm* — Fernando & Partners, LLP

(57) ABSTRACT

A method includes accessing a plurality of network sources by a crawler bank. The crawler bank includes a plurality of crawlers. Each crawler may be designated to specifically crawl at least one of the network sources. In some implementations, the method includes crawling each of the network sources to identify one or more featured content. In some implementations, the crawlers look to identify vulnerability reports on the network sources. In some implementations, crawlers look to identify vulnerability reports based on a predetermined set of rules. The predetermined set of rules may include a name of a product, a name of a vendor or manufacturer, a name and a version of a product, a product part number, etc. In some implementations, the method includes transmitting each of the identified featured content to the server. In such implementations, the crawlers transmit the identified vulnerability reports to the crawler bank on the server.

16 Claims, 5 Drawing Sheets

(56) References Cited

U.S. PATENT DOCUMENTS

| | | | |
|---|---|---|---|
| 2005/0071766 A1* | 3/2005 | Brill | G06F 16/951 |
| | | | 715/738 |
| 2005/0102292 A1* | 5/2005 | Tamayo | G06F 16/951 |
| 2006/0253582 A1* | 11/2006 | Dixon | G06F 16/951 |
| | | | 709/225 |
| 2007/0214097 A1* | 9/2007 | Parsons | G06Q 50/01 |
| | | | 706/12 |
| 2007/0283425 A1* | 12/2007 | Ture | G06F 21/6227 |
| | | | 726/5 |
| 2009/0119234 A1* | 5/2009 | Pinckney | G06N 20/00 |
| | | | 706/12 |
| 2011/0282860 A1* | 11/2011 | Baarman | G06F 16/951 |
| | | | 707/709 |
| 2012/0272160 A1* | 10/2012 | Spivack | H04L 51/32 |
| | | | 715/752 |
| 2013/0144863 A1* | 6/2013 | Mayer | G06F 16/951 |
| | | | 707/711 |
| 2013/0218865 A1* | 8/2013 | Angulo | G06F 16/248 |
| | | | 707/709 |
| 2016/0055243 A1* | 2/2016 | Xu | G06F 16/9535 |
| | | | 707/709 |
| 2016/0119365 A1* | 4/2016 | Barel | G06F 16/84 |
| | | | 726/12 |
| 2018/0077146 A1* | 3/2018 | Lonas | G06N 5/022 |
| 2018/0189913 A1* | 7/2018 | Knopp | G06Q 40/08 |
| 2019/0052652 A1* | 2/2019 | Takahashi | H04L 63/0236 |
| 2020/0134179 A1* | 4/2020 | Nilangekar | G06F 21/552 |

* cited by examiner

VULNERABILITY-DETECTION CRAWLER

TECHNICAL FIELD

The present disclosure generally relates to vulnerability detection, and in particular, to vulnerability-detection by using crawlers.

BACKGROUND

Vulnerabilities impacting software, hardware, and/or firmware are continuously being discovered. For an enterprise or any organization—regardless of whether a vulnerability impacts software, hardware or a system configuration—determining the relevance of the vulnerability as it relates to the IT resources of the enterprise is valuable for effective mitigation. While some of current solutions (such as OEMs and manufacturers' RSS) depend on user reports, some others (such as Google's Project Zero) rely on a general crawler which is designed for a search engine, hence is not content-specific. Most of them only rely on direct reports from the users. Some of these methods also offer rewards to users who report vulnerabilities to incentivize them. However, there is an urgent need for an integrated platform that covers a broad spectrum from vulnerabilities in micro-processors, kernel and operating systems to content management systems, ERP solutions, dev ops tools, networking gear, pen source software and much more. Timing is also valuable for proactive security measures, as vulnerabilities are constantly getting uncovered and its hours and minutes that matter when it comes to building a strategy to deal with them on a daily basis.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
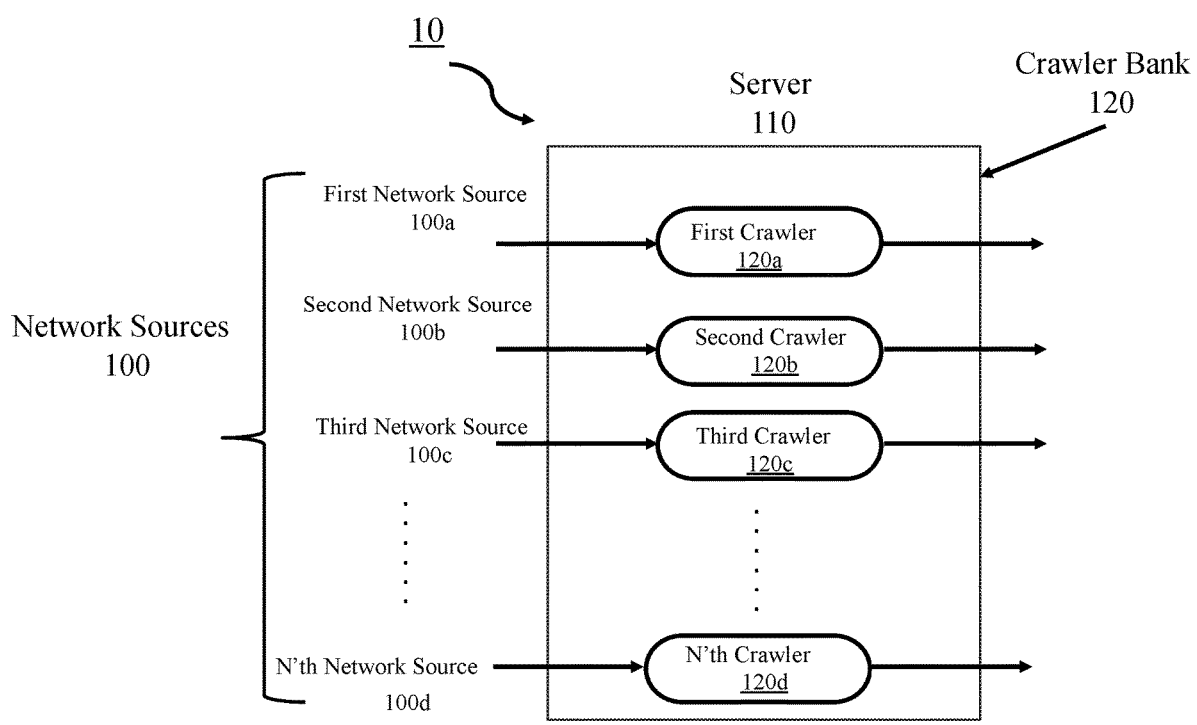
FIG. 1 is a block diagram of a system configured to detect vulnerability reports in network sources by a crawler bank in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable detecting vulnerability using a crawler bank. In some implementations, the method includes accessing a plurality of network sources by a crawler bank. In some embodiments, the crawler bank includes a plurality of crawlers. In various implementations, each crawler is designated to specifically crawl at least one of the network sources. The method includes crawling each of the network sources to identify one or more featured content. In some implementations, the crawlers look to identify vulnerability reports on the network sources based on a predetermined set of rules. In some embodiments, the predetermined set of rules includes a name of a product, a name of a vendor or manufacturer, a name and a version of a product, a product part number, etc. In some implementations, the method further includes transmitting each of the identified featured content to the server. In such implementations, the crawlers transmit the identified vulnerability reports to the crawler bank on the server. In some implementations, the method further includes using a machine-learning algorithm for parsing logic adaptability. The NLP is used to detect vulnerability reports when the reports contain different content format. For example, an RSS feed of a vendor may use a video file of a ransomware along with the textual report of the incident. In this case, the machine-learning algorithm may distinguish the video from the text of the RSS feed to detect vulnerability. In some embodiments, machine-learning algorithm in trained to operate by building a model from an example training set of input observations in order to make data-driven predictions or decisions expressed as outputs, rather than following static program instructions.

Software, hardware and firmware can have vulnerabilities. Left unaddressed, those vulnerabilities expose to risk the systems and products on which they are deployed and the people who depend on them. In order for vulnerable systems to be fixed, those vulnerabilities must first be found. Once found, the vulnerable code must be patched, the hardware must be recalled and fixed, or configurations must be modified. Patches must be distributed and deployed. In the traditional computing arena, most vendors and researchers have settled into a reasonable rhythm of allowing the vendor some time to fix vulnerabilities prior to publishing a vulnerability report more widely. Software as a service (SaaS) and software distributed through app stores can often fix and deploy patches to most customers quickly. On the opposite end of the spectrum, many Internet of Things (IoT) and embedded device vendors can be found for whom fixing a vulnerability might require a firmware upgrade or even physical replacement of affected devices, neither of which can be expected to happen quickly (if at all). This diversity of requirements forces vendors and researchers alike to reconsider their expectations with respect to the timing and level of detail provided in vulnerability reports. Coupled with the proliferation of vendors who are relative novices at internet-enabled devices and are just becoming exposed to the world of vulnerability research and disclosure, the shift toward IoT can be expected to reinvigorate numerous disclosure debates as the various stakeholders work out their newfound positions. A process must be defined intended to ensure that these steps occur in a way that minimizes the harm to society posed by vulnerable products. This application provides a system and a method thereof to tackle the first challenge in fixing vulnerabilities: to detect them and to detect genuine vulnerability reports.

There are several techniques to detect and report vulnerabilities. The process is usually the same; first a reporter learns of a vulnerability. For example, a reporter is a researcher, a scholar, an expert in the art, or someone who either is informed directly, or indirectly from someone else about the vulnerability. The reporter finds vulnerable product's vendor, reports vulnerability to vendor directly. Vendor then analyzes the report, verifies information is correct, and quickly acknowledges reporter. Vendor then usually provides information to reporter regarding patching the issue and the timeframe until the patch is released publicly. Reporter agrees to publish on the same day and may test the patch before public release and provide findings to vendor. Toward the end of the timeframe, before the patch is released, both vendor and reporter draft security advisories and share with each other for comment. The patch for the vulnerability may be released privately to affected downstream vendors (such as customers/users of the vulnerable product) at first. On an agreed-upon date, public security advisories are published detailing the issue, and how to obtain the patch or mitigate the issue. Typically, the vendor will release an advisory simultaneously with the reporter publishing an advisory on a security mailing list (such as Bugtraq or Full Disclosure), or even a personal blog. At the end, vulnerability is mitigated or addressed in some manner, and the public is informed through advisories about how to obtain the mitigation.

FIG. 1 is a block diagram of a system 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the system 10 includes one or more network sources 100 (e.g., a first network source 100*a*, a second network source 100*b*, a third network source 100*c*, an n'th network source 100*d*) and a server 110. In some implementations, the network sources 100 communicate with the server 110 via a network (not shown). In various implementations, the network includes a public network (e.g., a portion of the Internet, a cellular network, etc.) and/or a private network (e.g., a virtual private network (VPN)). In various implementations, the network sources 100 are referred to as web applications. For example, the network sources 100 may be Twitter accounts, Facebook accounts, RSS feeds, blogs, etc. In some embodiments, the server 110 may include a crawler bank 120. The crawler bank 120 may include one or more crawlers (e.g., a first crawler 120*a*, a second crawler 120*b*, a third crawler 120*c*, an n'th crawler 120*d*)

In some embodiments, each crawler 120 crawls one of the network sources 100 (e.g., the first crawler 120*a* crawls the first network source 100*a*, the second crawler 120*b* crawls the second network source 100*b*, etc.). In some implementations, one of the crawlers, crawls more than one network sources. For example, a crawler 120*a* crawls the network source 100*a* and the network source 100*b*. in various implementations, each crawler is designated to crawl a specific network source. Alternatively, in some embodiments, a crawler is designated to crawl more than one network sources. As an example, and not by way of limitations, a crawler specifically crawls twitter accounts. As another example, and not by way of limitations, in some embodiments, a crawler crawls RSS feeds of vendors. At yet another example, and not by way of limitations, a crawler specifically crawls blog posts.

The vulnerability reports may disclose a vulnerability in a software or a hardware of a system configuration of a product. In various implementations, a vulnerability is a set of conditions or behaviors that allows the violation of an explicit or implicit security policy. Vulnerabilities can be caused by software defects, hardware defects or malfunctions, configuration or design decisions, unexpected interactions between systems, or environmental changes. In various embodiments, vulnerabilities arise in information processing systems as early as the design phase and as late as system deployment. In various implementations, a vulnerability is a weakness in an information system, system security procedures, internal controls, or implementation that could be exploited or triggered by a threat source. In some embodiments, the vulnerability is a weakness in a system, application, or network that is subject to exploitation or misuse. In some other embodiments, the vulnerability is a weakness in an information system, system security procedures, internal controls, or implementation that could be exploited by a threat source.

In some embodiments, the crawlers find vulnerability reports on various respective network sources. In various implementations, vulnerability reports are reported by reporters/finder who is a researcher, a scholar, an expert in the art, or someone who either is informed directly, or indirectly from someone else about the vulnerability. In some embodiments, finder as an individual or organization that identifies a potential vulnerability in a product or online service. In some embodiments, finders can be researchers, security companies, users, governments, or coordinators. Although in some instances the finder may be different from the reporter, that is the user who reports the vulnerability may be different from the user who discovers the vulnerability, in the interest of consistency, terms finder and reporter are used interchangeably.

Vulnerabilities can be found by every user. All it takes is for someone to notice an unexpected or surprising behavior of a system. Although it is common for independent security researchers to hunt vulnerabilities as either a hobby or profession, finders need not self-identify as security researchers or hackers. In some embodiments, the reporters are students and professional academics studying novel ways to exploit systems or protocols. In various implementations, the reporters are open source developers who notice that a software bug has security implications. In other embodiments, the reporters are system administrators who recognize a vulnerability during the course of troubleshooting a system error. In yet other embodiments, the reports are professional security analysts who observe a previously unknown product vulnerability while testing an organization's infrastructure during a penetration test engagement. In yet other embodiments, the reporters are people using software or web services who mistyped some input or simply clicked on the wrong thing. In some embodiments, vulnerabilities are reported by organizations that look for them. In some instances, some of these organizations work under contract to vendors directly. In some embodiments, reporters work for the vendors' customers who deploy the software. Furthermore, in some embodiments, vendors may choose to look for vulnerabilities in their own products. This can be done via (a) in-house expertise and testing, (b) contracted security testing, or (c) solicited on a per-vulnerability basis using a bug bounty program. In the instances, where the vulnerability is reported on the network sources, the specific crawler that is designated to crawl the network source, may detect the vulnerability report and transmit it to the crawler bank 120 on the server 110.

In general, a vulnerability may be any operating issue in a software, a hardware, a firmware or a system configuration. In various embodiments, the vulnerability report is a report of a bug or a malware or a ransomware in a software. In some embodiments. In various embodiments, the vulnerability report is a report of a malfunction in a hardware. In various embodiments, the vulnerability report is a report of an issue in a system configuration.

In various embodiments, the crawler bank deploys the specific crawlers to detect vulnerability reports in specific network sources. In some embodiments, the network source is a twitter account or a Facebook account. In some embodiments, the network source is an RSS feed of a vendor or a manufacturer. In some embodiments, the network source is a post on a weblog dedicated to vulnerability reports. In some embodiments, the network source is any webpage or web application which reports vulnerability reports on a regular basis.

As software and computers find their way into more and more industries, more and more vendors find themselves becoming software and hardware vendors. In general, traditional software and hardware companies are vendors. However, any company or organization that provides a product that relies on a computer or software is referred to as a vendor, even if the company doesn't directly make the computer or software components used by its products. In some embodiments, a student who developed an application and placed it in a mobile app store for free download meets this definition of vendor, as does a large multinational company with thousands of developers across the globe. In some embodiments, an open source library which is maintained by a single person or a small independent team is referred to as an individual vendor.

In various implementations, a vendor is a company involved with consumer products, such as home automation and the internet of things (IoT). In some embodiments, a vendor is an internet service provider (ISP) and a maker of devices that access ISP services, such as internet modems, routers, access points. In some embodiments, a vendor is a mobile phone manufacturer and a service provider. In various implementations, a vendor is an industrial control system company, including building automation, an HVAC manufacturer, an infrastructure supplier and a smart utility service company including water and sewer services and the energy industry. In some embodiments, a vendor is a transportation service company, including the airline and automotive industries or a medical devices and health-related device manufacturer.

In various implementations, each crawler of the crawler bank looks to detect one or more predefined specific terms on a network source. In some embodiments, the crawlers look to detect a vendor's name on the network source. In some embodiments, the crawlers look to detect product name or product version on a network source. In various implementations, the crawlers look to detect a product part number in the network source. As an example, and not by way of limitations, a user may report a bug in an operating system of a computer device by stating the name and the version of the operating system. The user may post this report on their twitter account. The crawler then may access the network source, i.e. twitter account, and detect the name and the version of the software and transmits the report to the crawler bank on the server. As another example, and not by way of limitations, a blog entry on a weblog dedicated to hardware component, may report a malfunction in a specific component of a laptop. The blog entry may mention the name of the manufacturer or the part name and part number of the component. The crawler may access the network source, i.e. the blog entry, and detect the name and the part number of the component and transmits the report to the crawler bank on the server.

In various implementations, specific crawlers of the crawler bank, access their respective network sources. In some embodiments, one or more crawlers detect vulnerability reports on a same vulnerability. For example, two or more crawlers may detect an issue with a specific version of a software, which are reported on more than one network sources. In some embodiments, the vulnerability reports may be posted by different finders/reporters on different network sources. In some embodiments, the vulnerability reports may be posted by one finder/reporter on different network sources.

Reporters or finders may use different media content and formats to report vulnerability. For example, on twitter accounts, users may use multimedia files, pictures, audio files, etc. to report a vulnerability. In such instances, there is a need for pattern recognition to distinguish different content formats. In various implementations, the system uses a natural language processing (NLP) algorithm to detect contextual content (i.e. for parsing logic) and further detect vulnerability reports. For example, a blog entry may use a screen shot of a bug in a software of a vendor along with the textual report of the incident. In this case, the machine-learning may be used to distinguish the picture from the text of the blog entry in detecting vulnerability. In some embodiments, machine-learning algorithm in trained to operate by building a model from an example training set of input observations in order to make data-driven predictions or decisions expressed as outputs, rather than following static program instructions.

Figure 2:
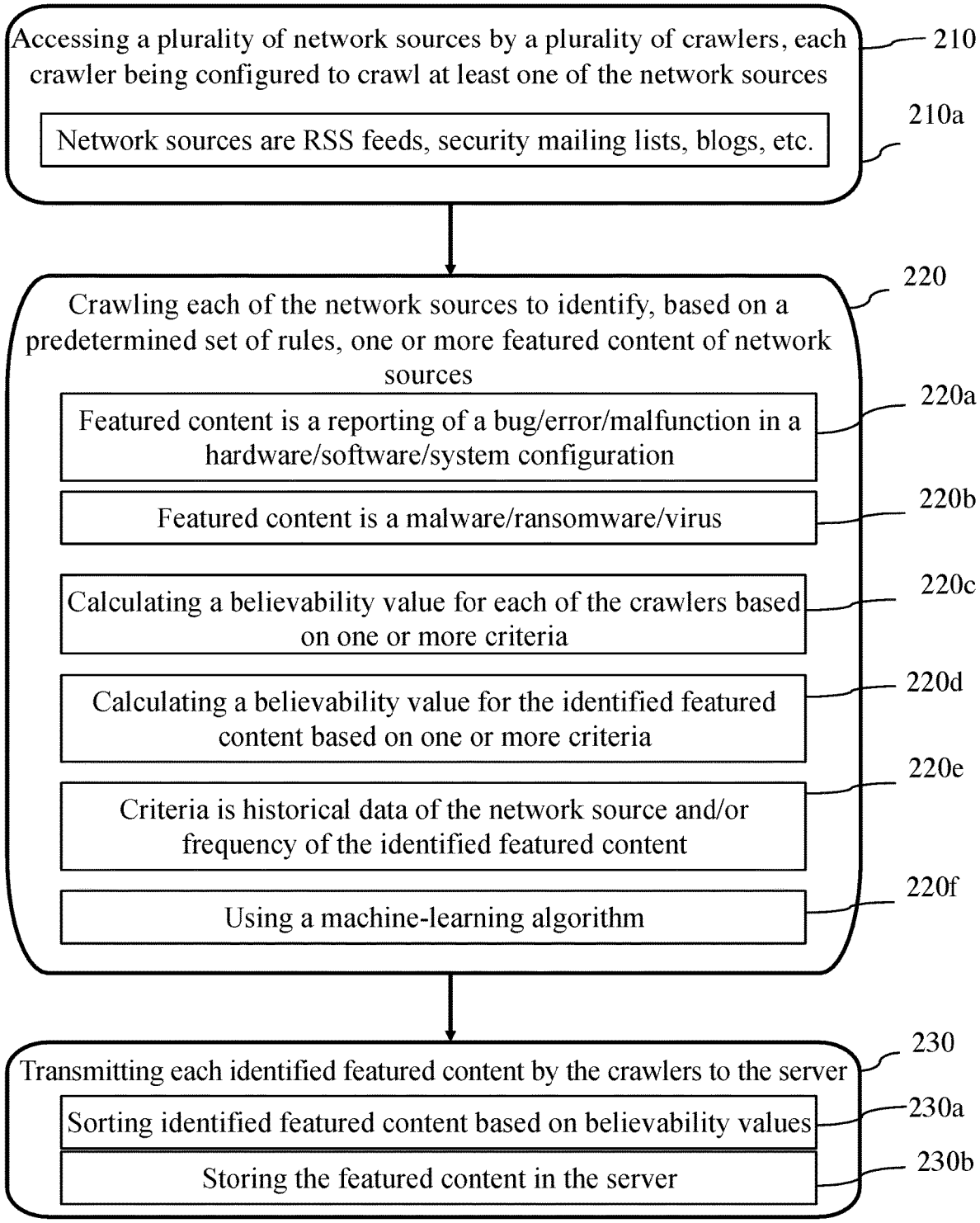
FIG. 2 is a flowchart representation of a method of detecting vulnerability reports in network sources by a crawler bank in accordance with some implementations.

FIG. 2 is a flowchart representation of a method 20 of detecting vulnerability by using a crawler bank in accordance with some implementations. In various implementations, the method 20 is performed by a crawler module associated with a crawler bank (e.g., the crawler bank 120 FIG. 1) on a server. Briefly, the method 20 includes accessing, by a crawler bank on the server, a plurality of network sources; crawling each of the corresponding network sources to identify one or more featured content and transmitting each of the identified featured content by the sub-crawlers to the server.

To that end, as represented by block 210, in some implementations the method 20 includes accessing a plurality of network sources (e.g., the network sources 100 shown in FIG. 1). In some implementations, accessing a plurality of network sources includes accessing the network sources by a crawler bank (e.g., the crawler bank 120 shown in FIG. 1). In some embodiments, the crawler bank includes a plurality of crawlers (e.g., the first crawler 120a, the second crawler 120b, etc. shown in FIG. 1). In various implementations, each crawler is designated to specifically crawl at least one of the network sources. In various implementations, the network sources are RSS feeds of service providers or manufacturers, or security mailing lists or blogs dedicated to report vulnerability, as represented by block 210a. In some implementations, the method 20 includes crawling each of the network sources to identify one or more featured content (step 220). In some implementations, the crawlers look to identify vulnerability reports on the network sources (e.g., vulnerability reports 130 shown in FIG. 1). In some implementations, crawlers look to identify vulnerability reports based on a predetermined set of rules. In some embodiments, the predetermined set of rules includes a name of a product, a name of a vendor or manufacturer, a name and a version of a product, a product part number, etc. In various implementations, as represented in block 220a, a vulnerability is any operating issue in a software, a hardware, a firmware or a system configuration. In various embodiments and as depicted by block 220b, the vulnerability report is a report of a bug or a malware or a ransomware in a software. In some embodiments. In various embodiments, the vulnerability report is a report of a malfunction in a hardware. In various embodiments, the vulnerability report is a report of an issue in a system configuration. In some embodiments, a believability score is calculated by a believability module associated with the server and assigned to the identified vulnerability reports. to evaluate the reliability (i.e., believability) of the identified vulnerability report. The believability may be calculated for each of the crawlers based on one or more criteria (as represented by block 220c) or for the identified featured content based on one or more criteria (as represented by block 220d). In various embodiments, the one or more criteria is historical data of the network sources and/or the frequency of the identified featured content, as shown by block 220e. In some implementations, the method 20 includes using a machine-learning algorithm for parsing logic adaptability, as shown in block 220f. In some implementations, the NLP is used to detect vulnerability reports when the reports contain different content format. For example, an RSS feed of a vendor may use a video file of a ransomware along with the textual report of the incident. In this case, the machine-learning algorithm may distinguish the video from the text of the RSS feed to detect vulnerability. In some embodiments, machine-learning algorithm in trained to operate by building a model from an example training set of input observations in order to make data-driven predictions or decisions expressed as outputs, rather than following static program instructions. In some embodiments, the network sources are Facebook accounts or twitter accounts. In some implementations, the method 20 includes transmitting each of the identified featured content to the server (step 230). In such implementations, the crawlers transmit the identified vulnerability reports to the crawler bank on the server. In various implementations, the system sorts the identified featured content based on their respective believability values (as shown by block 230a). In some embodiments, the system stores the featured content in the server, as represented by block 230b.

Figure 3A:
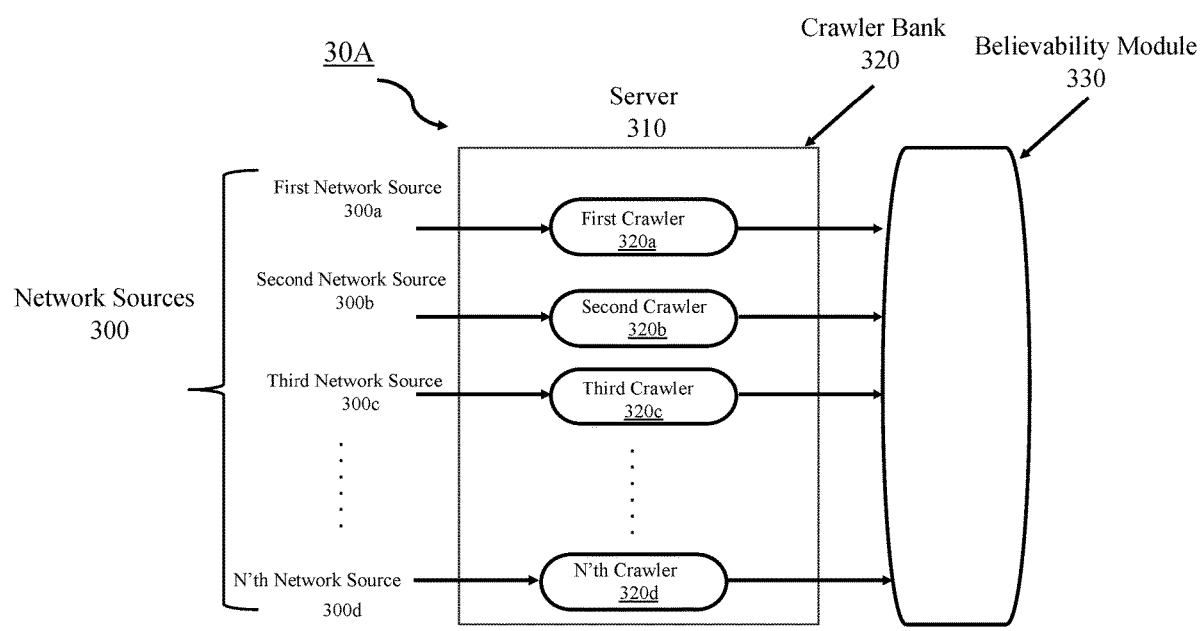
FIGS. 3A and 3B are block diagrams of a system configured to detect vulnerability reports in network sources by a crawler bank, coupled with a believability module in accordance with some implementations
Figure 3B:
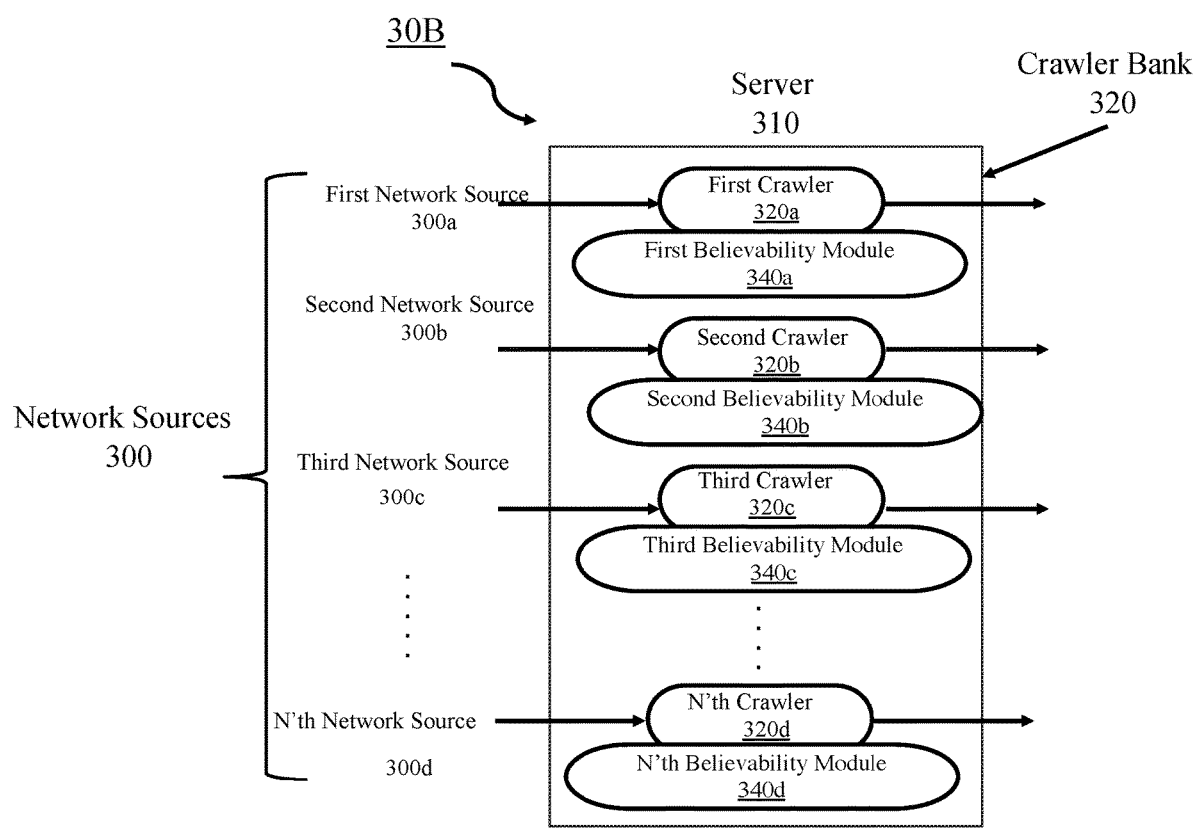

FIGS. 3A and 3B are block diagrams of a system 30A and 30B in accordance with some implementations. the system 30A includes network sources 300 which may include one or more network sources 300a, 300b, 300c, 300d and a server 310. In some implementations, the network sources 300 communicate with the server via a network (not shown). In various implementations, the network includes a public network (e.g., a portion of the Internet, a cellular network, etc.) and/or a private network (e.g., a virtual private network (VPN)). In various implementations, the network sources are referred to as web applications. For example, the network sources may be twitter accounts, Facebook accounts, RSS feeds, blogs, etc. In some embodiments, the server may include a crawler bank 320. The crawler bank may include one or more crawlers (e.g., a first crawler 320a, a second crawler 320b, a third crawler 320c, an n'th crawler 320d).

Briefly, the crawlers access a plurality of network sources; crawl each of the corresponding network sources to identify one or more featured content and transmit each of the identified featured content to the server. Not all of the vulnerability reports are reliable. In some instances, the vulnerability report is not serious. For example, a user may tweet a bug in a software as a joke. As another example, a blog entry of a weblog may report a false vulnerability about a competitor's product to promote their product and harm a competitor. Thus, in some embodiments, a believability score is calculated by a believability module 330 associated with the server 310 and assigned to the identified vulnerability reports. The believability is assigned to evaluate the reliability (i.e., believability) of the identified vulnerability report. However, the believability score is not same as a risk level. The believability score is calculated to assess a vulnerability report's reliability. A risk level is calculated to assess the severity (i.e. magnitude of impact) of the vulnerability. In various implantations, the believability module 330 associated with the server 310 calculates the believability score based on one or more features. In some embodiments, the one or more features is historical data of a finder/reporter or a network source. For example, when a network source has historically reported reliable vulnerability reports, the believability module 330 associated with the server assigns a high believability score to the network source. Alternatively, the believability module 330 associated with the server assigns a low believability score to the weblog of the previous example, which, in the past, has reported a false vulnerability about a competitor's product to promote their product and harm a competitor. In some embodiments, the believability module 330 associated with the server uses a frequency of a vulnerability report to calculate a believability score. For example, the believability module 330 associated with the server assigns a higher believability score to a vulnerability report that has reported in five different network sources, compared to a vulnerability report that has reported only on one network source. Referring now to FIG. 3B, in some embodiments, a believability score is calculated and assigned to each of the crawlers. In these instances, a believability module is associated with each crawler (e.g., the first believability module 340a, the second believability module 340b, third believability module 340c, the n'th believability module 340d). In some embodiments, each believability module calculates and assigns a believability score to the identified vulnerability of each crawler of the crawler bank. In various implantations, each believability module calculates the believability score for the respective crawler based on one or more features. In some embodiments, the one or more features is historical data of a finder/reporter or the specific network source associated with the crawler. For example, when a network source has historically reported reliable vulnerability reports, the first believability module 340a associated with the first crawler assigns a high believability score to the network source. In some embodiments, each believability module uses a frequency of a vulnerability report to calculate a believability score. For example, the first believability module 340a associated with the first crawler assigns a higher believability score to a vulnerability report that has reported by five different users of the respective network source, compared to a vulnerability report that has reported only by one user of the respective network source.

Figure 4:
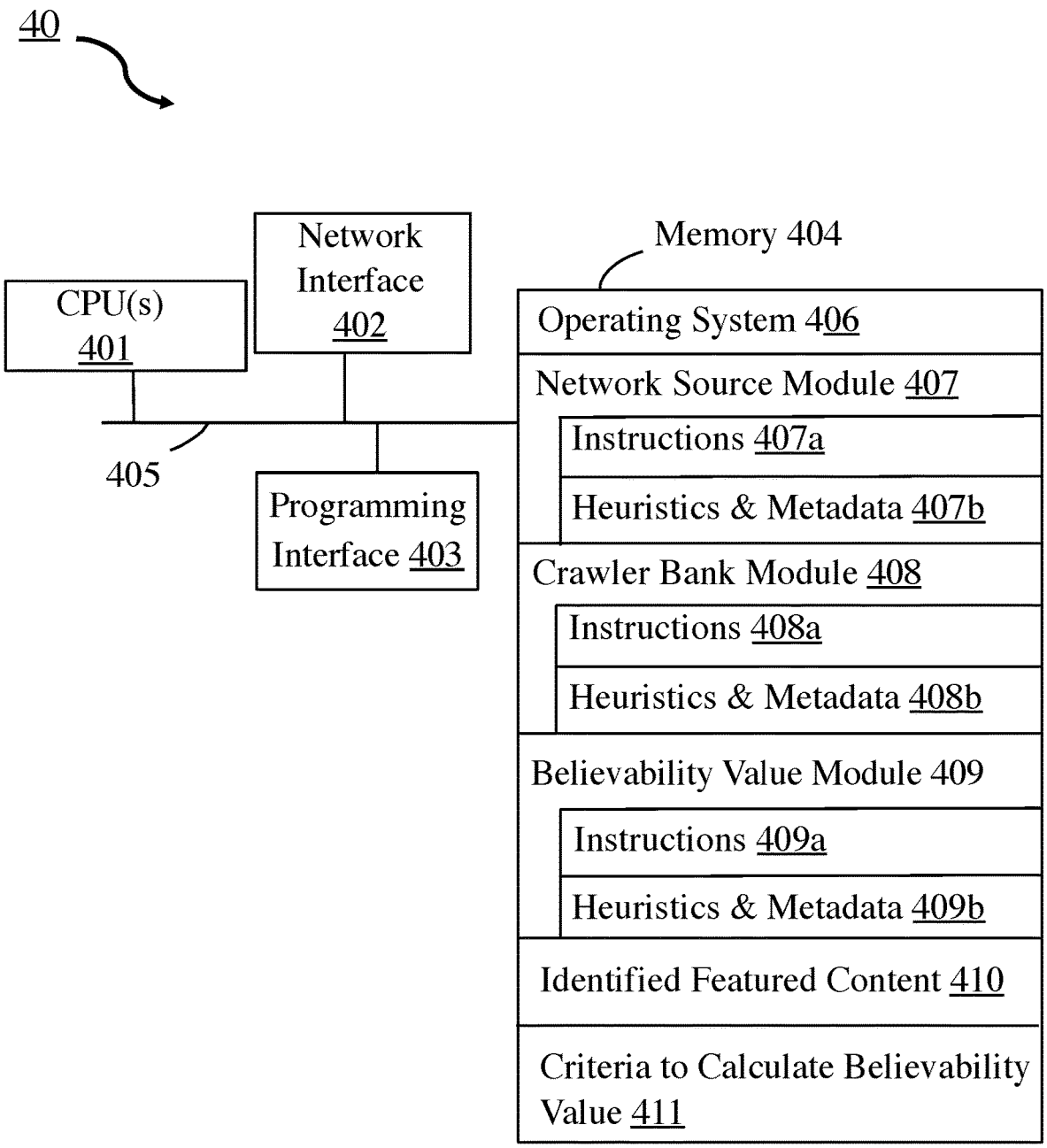
FIG. 4 is a block diagram of a server system enabled with various modules that are provided to access network sources, detect vulnerability reports and transmit them to the server in accordance with some implementations.

FIG. 4 is a block diagram of a system 40 enabled with a vulnerability detection crawler bank in accordance with some implementations. In other words, in some implementations, the system 40 implements vulnerability detection using a crawler bank. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 400 includes one or more processing units (CPUs) 401, a network interface 402, a programming interface 403, a memory 404, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the communication buses 405 include circuitry that interconnects and controls communications between system components. The memory 404 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 404 optionally includes one or more storage devices remotely located from the CPU(s) 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, a network source module 407, a crawler bank module 408, and a believability module 409. In various implementations, the network source module 407 and the crawler bank module 409 perform substantially the same operations as the network source module 100, and the crawler bank module 120, respectively, shown in FIG. 1. To that end, in various implementations, the memory 404 includes instructions and/or logic 407a, 408a and 409a, and heuristics and metadata 407b, 408b and 409b that are associated with the network source module 407, the crawler bank module 408 the believability value module 409, the identified featured content 410 and the criteria to calculate believability value 411. The operating system 406 includes procedures for handling various basic system services and for performing hardware dependent tasks.

In various implementations, the crawler bank module 408 accesses a network sources module 407 (e.g., the network sources 100 shown in FIG. 1). In some embodiments, the crawler bank module 408 includes a plurality of crawlers (e.g., the first crawler 120a, the second crawler 120b, etc. shown in FIG. 1). In various implementations, each crawler is designated to specifically crawl at least one of the network sources of the network source modules 407. In some implementations, the crawlers of the crawler bank module 408 crawl each of the network sources to identify one or more featured content. In some implementations, the crawlers look to identify vulnerability reports on the network sources (e.g., vulnerability reports 130 shown in FIG. 1). In some implementations, crawlers look to identify vulnerability reports based on a predetermined set of rules. In some embodiments, the predetermined set of rules includes a name of a product, a name of a vendor or manufacturer, a name and a version of a product, a product part number, etc. In some implementations, the crawlers transmit each of the identified featured content to the server. In such implementations, the crawlers transmit the identified vulnerability reports to the crawler bank on the server. In some implementations, an NLP is used to detect vulnerability reports when the reports contain different content format. For example, an RSS feed of a vendor may use a video file of a ransomware along with the textual report of the incident. In this case, the machine-learning algorithm may distinguish the video from the text of the RSS feed to detect vulnerability. In some embodiments, machine-learning algorithm in trained to operate by building a model from an example training set of input observations in order to make data-driven predictions or decisions expressed as outputs, rather than following static program instructions.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a server including one or more processors and a non-transitory memory:
   accessing, by a crawler bank on the server, a plurality of network sources, the crawler bank comprising a plurality of sub-crawlers, each of the plurality of sub-crawlers being configured to crawl at least one of the plurality of the network sources;
   crawling, by the crawler bank, each of the plurality of network sources to identify, based on a predetermined set of rules, one or more featured content of each of the plurality of network sources, wherein each network source being crawled by a corresponding one of the plurality of sub-crawlers;
   assigning respective believability values to the one or more featured content, the respective believability values being calculated based on one or more criteria, wherein the respective believability values are numbers between 0 and 1;
   sorting the one or more featured content based on the respective believability values; and
   transmitting a sorted version of the one or more featured content to the server.

2. The method of claim 1 further comprising:
   detecting, by a machine-learning algorithm, different content of the plurality of network sources to identify the one or more featured content, wherein the machine-learning algorithm is trained to develop a parsing logic.

3. The method of claim 1, wherein the one or more featured content comprises a reporting of a bug or an error in a hardware, in a software or in a system configuration of a provider.

4. The method of claim 1, wherein the one or more featured content comprises a reporting of a malware, a ransomware or a virus in a software of a provider.

5. The method of claim 1, wherein the plurality of network sources comprises an RSS feed of a content provider or a manufacturer, a security mailing list of a content provider or manufacturer, or a web application dedicated to reporting errors or malfunction of software, hardware or system configurations.

6. The method of claim 1, wherein assigning the respective believability values to the one or more featured content comprises:
   using respective believability functions associated with the plurality of sub-crawlers to calculate the respective believability values.

7. The method of claim 1, wherein the one or more criteria is historical data of the plurality of network sources or a frequency of the one or more featured content.

8. A non-transitory computer storage that stores executable program instructions that, when executed by one or more computing devices, configure the one or more computing devices to:
   access, by a crawler bank on a server, a plurality of network sources, the crawler bank comprising a plurality of sub-crawlers, each of the plurality of sub-crawlers being configured to crawl at least one of the plurality of the network sources;
   crawl, by the crawler bank, each of the plurality of network sources to identify, based on a predetermined set of rules, one or more featured content of each of the plurality of network sources, wherein each network source being crawled by a corresponding one of the plurality of sub-crawlers;
   assign respective believability values to the one or more featured content, the respective believability values being calculated based on one or more criteria, wherein the respective believability values are numbers between 0 and 1;
   sort the one or more featured content based on the respective believability values; and
   transmit a sorted version of the one or more featured content to the server.

9. The non-transitory computer storage of claim 8, wherein the executable program instructions further configure the one or more computing devices to:
   detect, by a machine-learning algorithm, different content of the plurality of network sources to identify the one or more featured content, wherein the machine-learning algorithm is trained to develop a parsing logic.

10. The non-transitory computer storage of claim 8, wherein the one or more featured content comprises a reporting of a bug or an error in a hardware, in a software or in a system configuration of a provider.

11. The non-transitory computer storage of claim 8, wherein the one or more featured content comprises a reporting of a malware, a ransomware or a virus in a software of a provider.

12. The non-transitory computer storage of claim 8, wherein the plurality of network sources comprises an RSS feed of a content provider or a manufacturer, security mailing list of a content provider or manufacturer, or a web application dedicated to reporting errors or malfunction of software, hardware or system configurations.

13. The non-transitory computer storage of claim 8, wherein assigning the respective believability values to the one or more featured content comprises:
   using respective believability functions associated with the plurality of sub-crawlers to calculate the respective believability values.

14. The non-transitory computer storage of claim 13, wherein the one or more criteria is historical data of the plurality of network sources or a frequency of the one or more featured content.

15. A device comprising:
   a network interface;
   a processor configured to execute computer readable instructions included on a non-transitory memory; and
   a non-transitory memory including computer readable instructions, that when executed by the processor, cause the device to:
   access, by a crawler bank on a server, a plurality of network sources, the crawler bank comprising a plurality of sub-crawlers, each of the plurality of sub-crawlers being configured to crawl at least one of the plurality of the network sources;
   crawl, by the crawler bank, each of the plurality of network sources to identify, based on a predetermined set of rules, one or more featured content of each of the plurality of network sources, wherein each network source being crawled by a corresponding one of the plurality of sub-crawlers;
   assign respective believability values to the one or more featured content, the respective believability values being calculated based on one or more criteria, wherein the respective believability values are numbers between 0 and 1;

sort the one or more featured content based on the respective believability values; and transmit a sorted version of the one or more featured content to the server.

16. The device of claim 15, wherein assigning the respective believability values to the one or more featured content comprises:

using respective believability functions associated with the plurality of sub-crawlers to calculate the respective believability values.

* * * * *